Nov. 18, 1958 J. W. HAMMES 2,860,834
WASTE DISPOSAL APPARATUS
Filed Sept. 20, 1952 8 Sheets-Sheet 1

INVENTOR.
JOHN W. HAMMES
BY
Barnes, Kisselle, Laughlin & Raisch
ATTORNEYS

Nov. 18, 1958                    J. W. HAMMES                    2,860,834
                            WASTE DISPOSAL APPARATUS
Filed Sept. 20, 1952                                          8 Sheets-Sheet 3

INVENTOR.
JOHN W. HAMMES
BY
*Barney, Kisselle, Laughlin & Raisch*
ATTORNEYS

Nov. 18, 1958  J. W. HAMMES  2,860,834
WASTE DISPOSAL APPARATUS
Filed Sept. 20, 1952  8 Sheets-Sheet 5

INVENTOR.
JOHN W. HAMMES
BY
Barnes, Kisselle, Laughlin & Raisch
ATTORNEYS Nov. 18, 1958    J. W. HAMMES    2,860,834
WASTE DISPOSAL APPARATUS

Filed Sept. 20, 1952    8 Sheets-Sheet 6

INVENTOR.
JOHN W. HAMMES
BY
ATTORNEYS

Nov. 18, 1958   J. W. HAMMES   2,860,834
WASTE DISPOSAL APPARATUS
Filed Sept. 20, 1952   8 Sheets-Sheet 8

INVENTOR.
JOHN W. HAMMES
BY
Barnes, Kisselle, Laughlin & Raisch
ATTORNEYS

United States Patent Office 2,860,834
Patented Nov. 18, 1958

2,860,834

WASTE DISPOSAL APPARATUS

John W. Hammes, Racine, Wis.; Freda Hammes, executrix of John W. Hammes, deceased, assignor of one-third to herself, one-third to Ever J. Hammes, and one-third to Quinten A. Hammes, all of Racine, Wis.

Application September 20, 1952, Serial No. 310,582

17 Claims. (Cl. 241—32.5)

This invention relates to apparatus for disposal of waste material and aims to provide an improved construction and an improved control device combined with a sink drain assembly.

A number of devices have heretofore been proposed for the disposal of kitchen waste material but are subject to certain disadvantages and inconveniences which the present invention seeks to overcome.

The part of the disposal unit primarily available to the user is the feed inlet and control. He must use this inlet as the normal sink drain when no waste material is involved. When waste is to be disposed of, the drain becomes a hopper into which waste is loaded. When the unit is loaded, the protective cover becomes a control actuator.

Recently sink manufacturers have standardized the sink drain opening to 3½ inches, which results in a final feed opening of about 3¼ inches when the supporting ring is in place. This is ample for batch feeding, that is, for that type of feeding in which a charge of waste is loaded into the disposal unit prior to the time that the unit is turned on.

The present invention contemplates a control device for the waste disposal unit which is insertable in the batch feed opening and which permits also continuous feeding of the unit, insures ample water flow to the unit while operating, and prevents the insertion of the hands into the unit.

Thus, during the operation, reasonable quantities of waste material may be fed to the machine, and the messy agglomerates of food, which accumulate as water settles in the sink, may pass into the drain without affecting the water flow to the unit. The comminuting rotor may be easily started, stopped, or reversed, when the drain is in the continuous feed position.

In spite of the capacity for continuous feeding, the sink opening ring is of such shape and size to make the comminuting rotor safe from outside inquisitiveness.

Still another object is the provision of a combined housing construction and switch control which permits convenient positioning of the switch in a side cavity in the housing formed by reason of an off-set neck support.

In outline, the invention comprises a power-driven shredding cutter which co-operates with a housing positioned below the drain opening of a sink. This housing is off-set from the drain opening to provide an angular entrance, and at the entrance is positioned a removable control device, one portion of which serves as a switch actuator and another portion of which serves as a partial closure member for the drain opening.

Other objects and features of the invention relating to details of construction and operation, such as safety locking features, and housing details, will be evident in the following description and claims.

Drawings accompany the specification, and the various views thereof may be briefly described as:

Figure 18, an enlarged elevation of the side of the primary stopper unit showing the switch control cam groove.

Figure 2:
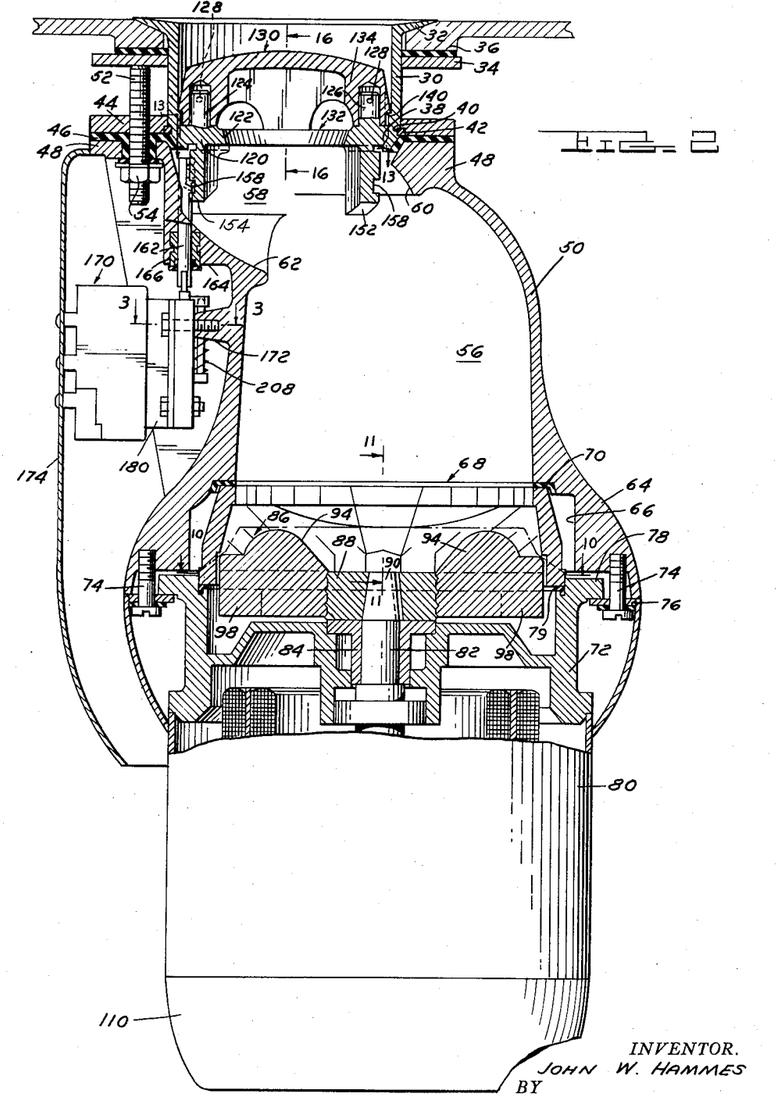
Figure 2, a vertical sectional view on line 2—2 of Figure 1.
Figures 3, 4:
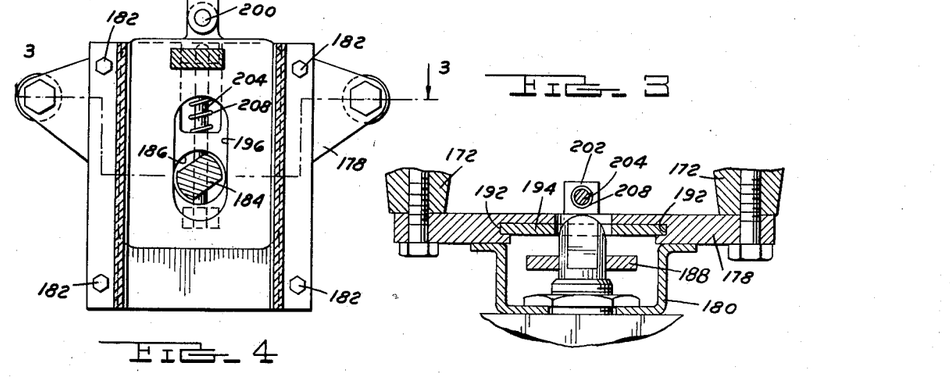
Figure 3, a sectional view of the switch on line 3—3 of Figures 2 and 4.
Figure 4, a sectional view of the switch mechanism on line 4—4 of Figure 5.

Referring to the drawings, Figure 2 is the best composite view of the parts of the combination. A supporting collar 30 has a sink flange 32 which co-operates with a drain opening in the sink. A back-up ring 34 supports a gasket 36 which co-operates with the bottom surface of the sink around the opening.

Near the lower edge of the collar 30 is an inturned annular edge 38, and on the outside of the collar near this inturned edge is an annular square-corner groove 40 in which is located a snap ring 42. Snap ring 42 co-operates with a mounting flange 44 which overlies a molded rubber gasket 46 sitting on the top surface 48 of a housing 50 to be supported below the drain collar 30.

Three bolts 52, one of which is shown in Figure 2, pass through the flange portion at the top of the housing and through the mounting plate 44 to press against the back sealing plate 34. Tightening of these threaded bolts 52 tightens the flange 48 of housing 50 against the supporting plate 44 and the annular inturned flange 38 on the collar 30. This also tightens the gasket 36 against the bottom of the sink. Nuts 54 holds these bolts in place.

It will be noticed that the housing 50 has a central charging chamber 56 and that the entrance of the charging chamber is off-set to the left as viewed in Figure 2 at 58. Curved shoulders 60 and 62 join the entrance with the passage 56. The bottom of the housing 50 is flared out at 64 to provide an annular recess 66 in which is located a shredding ring 68.

A top mounting gasket 70 positions the ring in the opening 66. This ring is preferably a casting formed of very hard, wear-resistant metal. Ring 68 is held in place by a motor end-bell 72 which is pressed upwardly by bolts 74 acting on body lugs 76 which press against a flange 78 at the top of the end-bell. A pressure and sealing ring 79 is interposed between the end-bell 72 and the lower edge of ring 68.

Figures 10, 11, 12:
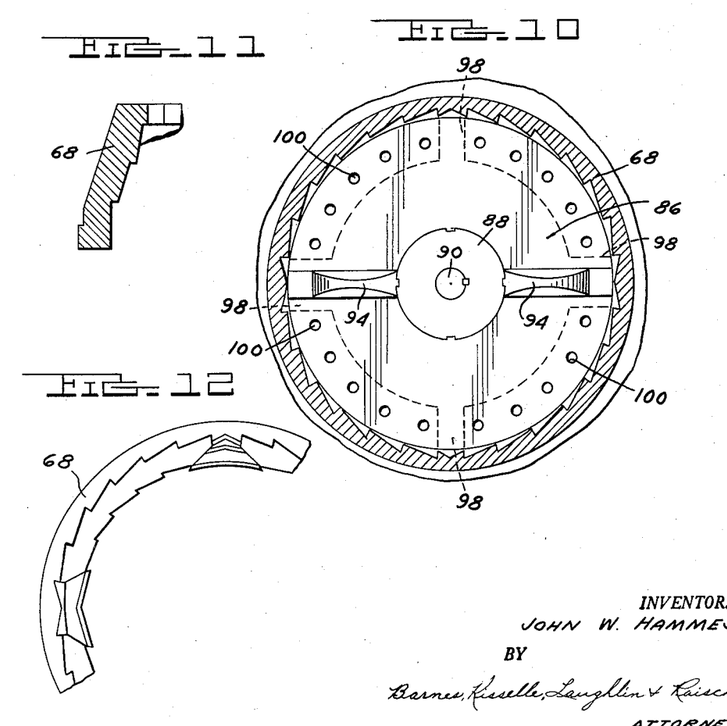
Figure 10, a sectional view on line 10—10 of Figure 2.
Figure 11, a sectional view of the shredder on line 11—11 of Figure 2.
Figure 12, a fragmentary bottom view of the shredder looking up as it is shown in Figure 2.

The details of the shredding ring 68 are shown in Figures 10, 11 and 12. This ring is formed with teeth, one-half of which are disposed to cut in one direction and the remaining of which are disposed to cut in another direction.

Below the end-bell 72 is an electric motor 80 which has a drive shaft 82 passing through a bushing 84 in the end-bell. On the shaft above the bushing 84 is a rotatable cutter head 86 having a cast steel insert 88 centrally thereof transfixed by a tapered end 90 of the motor shaft. The tapered end 90 is keyed to the steel insert 88.

The cutter head 86 has two diametrically disposed curved blades 94. As shown best in Figures 9 and 10, the cutter head is cut away on the bottom surface from a hub portion 96 except at four points spaced 90 degrees apart where a radial rib 98 extends to the edge of the cutter head.

Between the radial ribs 98 and outside the hub 96 are holes 100 which taper downwardly and outwardly, five holes being positioned in each quadrant as shown best in Figure 10. These holes are to facilitate drainage through the rotor head.

Figure 9:
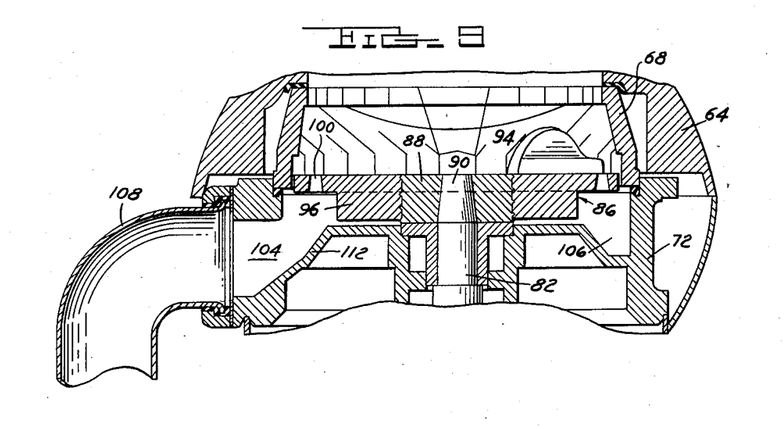
Figure 9, a sectional view of the shredding mechanism and the top of the motor housing on line 9—9 of Figure 1.

The outlet for the device is shown in Figure 9 wherein the end-bell 72 and outlet opening 104 project radially outward from an annular race 106. A suitable drain pipe 108 is fastened and sealed to the end-bell 72 at this point. The motor housing is completed by an end-bell 110.

It will be seen that the end-bell 72 has a relatively thin wall 112 adjacent the annular race 106 below the impeller 86. This wall can serve as a heat transfer wall from the motor housing, the water carrying away the heat and eliminating the necessity for additional cooling means for the motor.

Earlier in the description the sink drain ring 30 which serves as a supporting collar for the entire device was described. This ring serves as the load opening for the waste disposal unit. In order to permit the use of the sink for dishwashing and other washing functions, a closure member for this ring 30 may be provided. It is also necessary to have some closure member for the sink opening for safety purposes to prevent the introduction of the hands into the unit when it is operating. These functions are performed by a drain closure combination shown best in Figures 2 and 13 to 21.

In Figure 2 the first element of the combination is shown as an outer ring 120 having a sealing and rotatable engagement with the lower inside surface of the collar 30. This ring is supported on the inwardly turned flange 38 of the collar 30 and has a central opening 122 with the edges tapering inwardly and downwardly.

Figure 19:
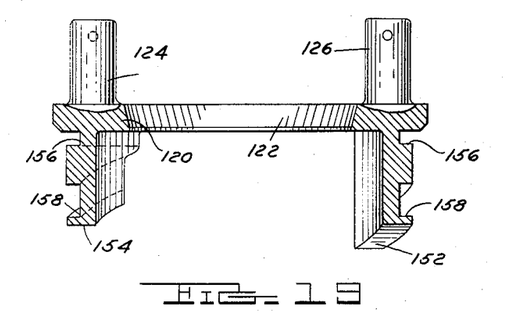
Figure 19, a sectional view of the primary stopper member for the sink drain opening.
Figure 20:
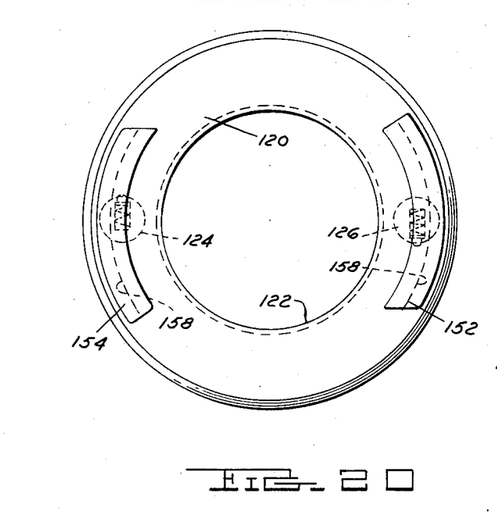
Figure 20, a bottom view of the primary stopper means shown in Figure 19.

Projecting upwardly on opposite sides of this ring 120 are two integral studs 124 and 126. In each of these studs is mounted a spring pressed detent ball 128 which projects a short distance beyond the contour of the studs in opposite directions as shown in Figures 2, 19 and 20.

Figure 17:
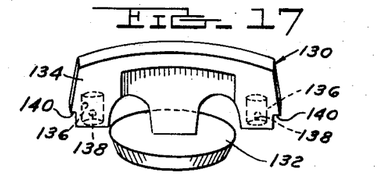
Figure 17, a perspective view of the supplemental stopper control unit.
Figure 21:
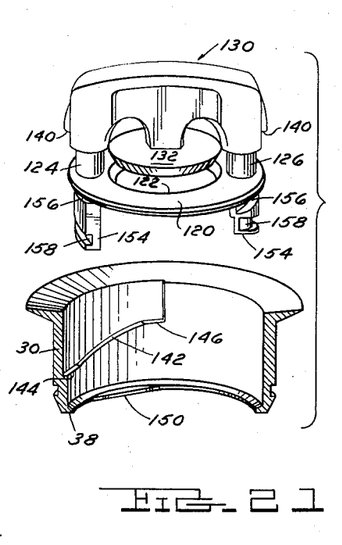
Figure 21, a view of the primary and secondary stopper means together with a sectional view of the sink drain opening showing the relationship of these parts.

A second closure member and control member 130 is shown in Figures 2, 17 and 21. This member consists of a secondary stopper unit 132 to have a sealing engagement with the opening 122 and a cross handle 134 which extends diametrically of collar 30 and which at each end has cylindrical openings 136 to receive the studs 124 and 126. Small detent recesses 138 are positioned to co-operate with the ball detents 128. The cross member 134 also has projecting ledges or shoulders 140 which are intended to co-operate with opposed cam ledges 142 in ring 30 (see Figures 14 and 15).

Cam ledge 142 starts at a horizontal surface 144 and terminates at a higher horizontal surface 146. As the device is shown in Figure 2 the shoulders 140 are over the lower horizontal surface 144 so that the sealing plate 132 is in sealing position. If the horizontal handle portion 134 is turned in a clockwise direction looking down on the unit, the shoulders 140 will ride upward on cam ledge 142 and unit 130 will be raised to the point that the detents 128 will engage the detent openings 138. The device is then in a position to be lifted bodily from the opening in the ring 30 as shown in Figure 21.

The stopper unit 120—130 also has a control function for the motor which drives the shaft 82. The parts which participate in this control function will now be described.

Figure 13:
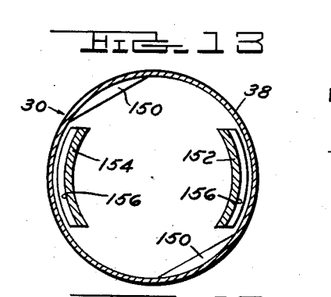
Figure 13, a sectional view on line 13—13 of Figure 2.
Figure 14:
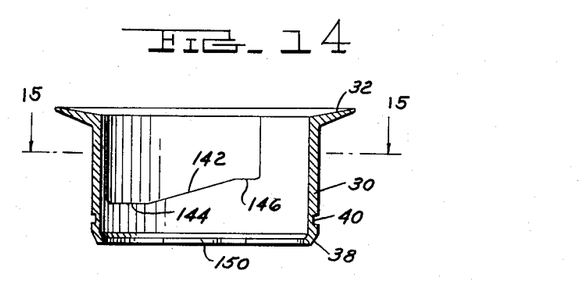
Figure 14, a vertical section of the sink collar support device.
Figure 15:
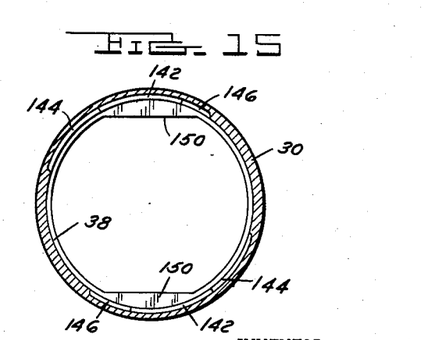
Figure 15, a sectional view of the sink collar support on line 15—15 of Figure 14.
Figure 16:
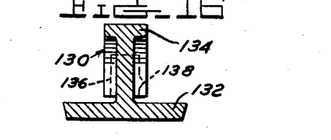
Figure 16, a sectional view of the stopper device on line 16—16 of Figure 2.

It will be noted from Figures 13 and 15 that the ring 30 has two straight ledge portions 150. These portions co-operate with arcuate lugs 152 and 154 which depend on opposed sides of member 120. These lugs have grooves 156 which engage the ledges 150 when the lugs are turned as shown in Figure 13. Also formed in the outer surfaces of lugs 152 and 154 are cam grooves 158 which angle downwardly from an entrance end 160. These cam grooves are intended to co-operate one at a time with a switch actuator pin 162 (Figures 2 and 18).

Slidably mounted in a portion 164 on one side of housing 50 a sealing insert 166 surrounds the pin 162 which projects upwardly to be positioned directly adjacent the lug 154 as shown in Figure 2. A roller 168 is positioned at the end of pin 162 to engage the groove 158. Due to the straight ledges 150 on ring 30 the combination unit 120-130 is removable when the pin 162 has been moved to its top-most position. Thus, the engagement when the starter is re-inserted will always be at this same position. The ring 120 locks in drain ring 30 with the slightest rotation. It will be noted that the pin 162 is positioned under the ledge 38 of the sink ring 30. Pin 162 actuates a switch mechanism shown generally at 170 mounted between the housing 50 on a lug 172 and a cover plate 174 surrounding a portion of one side of the housing 50. The switch 170 is a reversing switch which actuates the motor of the combination in a different direction each time it is shifted. The mechanism for actuating the switch is shown best in Figures 3 to 8.

Between the switch box 170 and the housing 50 a cage is formed by a plate 178 bolted to the lugs 172 of the housing and a bracket plate 180 bolted to the plate by bolts 182. An actuating shaft 184 projects from the switch housing 170 through an opening 186 in plate 178. Mounted on the shaft 184, which is flattened on opposite sides, is a ratchet actuator 188 having four teeth 190 spaced an equal distance around the periphery of the actuator.

Vertically slidable in re-entrant slots 192 (Figure 3) in plate 178 is an actuator plate 194 which has a vertically elongate opening 196 through which passes the shaft 184. Plate 194 has an upwardly projecting tab 198 which is received in a slot in the lower end of pin 162 and held by a cross pin 200.

A side projection 202 on plate 194 is transfixed by a stationary pin 204 mounted in a projection 206 on plate 178. A spring 208 is positioned between projections 202 and 206 to serve as a returning force for plate 194.

Figure 7:
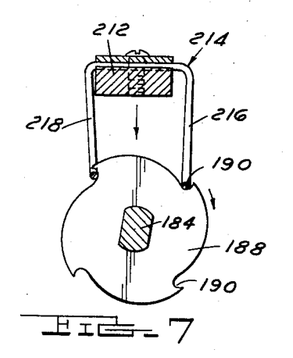
Figures 7 and 8, views of the switch mechanism as shown respectively on line 7—7 of Figure 5 and line 8—8 of Figure 6.
Figure 8:
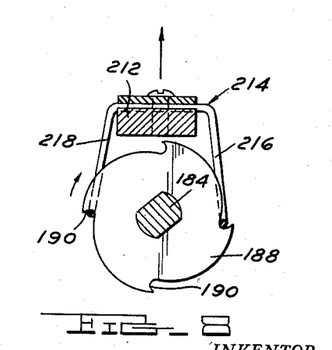

On the top of plate 194 is a projection 212 on which is mounted a double-legged spring actuator member 214 having legs 216 and 218 (see Figures 7 and 8). The member 214 is formed of spring wire, and the legs are of resilient material. They are placed to straddle the sides of the tooth actuator 188 so that on the downward stroke of plate 194 the right-hand leg 216, as shown in Figure 7, will engage the uppermost tooth 190 on the right-hand side of the member 188 and move it downwardly while the legs themselves slide apart during this motion. At the downward limit of the stroke the leg 218 will snap over another tooth 190, as shown in Figure 8, so that on the upward stroke the wheel actuator 188 will be rotated in a clockwise direction. Consequently, regardless of whether the plate 194 is moving up or down the actuator wheel 188 will always move in a clockwise direction.

In the operation, it is customary with devices of this type to have them arranged so that water may enter the device as the cutting operation takes place. In many instances these devices are set up so that unless the water is turned on the device will not operate.

It is necessary, therefore, to have control unit for the device which is arranged to pass water to the device from the sink whenever the unit is turned on. This is accomplished in the following way: As shown in Figure 13, the sink ring 30 has flat sides 150. The composite stopper unit as shown in Figure 21 is dropped into the ring 30 so that the lugs 152 and 154 pass between these flats 150. In this position the ring 120 will come to rest against the inturned flange 38, and the secondary stopper member 132 can be moved into position blocking the opening 122 by pushing down on the control handle 130, thus effectively stopping up the drain hole if the sink is to be used for dishes.

The drain may be opened in two ways: First, by lifting the combination stopper unit 130—120 bodily out of the sink drain collar 30 as shown in Figure 21.

This would be done for loading the chamber 56 with a large quantity of waste material which is commonly called a "batch" load. To start the unit it is then necessary to replace the combination stopper into the opening, as shown in Figure 2, and then to turn the stopper 90 degrees in a clockwise direction. When this is done, the flat ledges 150 will engage the grooves 156 of the ring 120.

At the same time, the shoulders 140 will ride upwardly on the cam ledges 142 to open the stopper member 132. Also in this movement the switch pin 162 will engage the groove 158 (Figure 18) and be moved downwardly by reason of this camming groove against the spring 208. This motion will actuate switch 170 and cause the motor to start driving the impeller 86. As long as the device is turned in this switch actuating position the drain opening 122 will remain open and water may flow into the unit.

It is possible when the motor is operating to lift the handle 130 off from the primary sealing ring 120 and feed small portions of waste material into the unit. Due to the fact that the opening is offset from the center of the rotor the material being shredded does not fly out of the opening but is confined to the chamber 56.

Figure 1:
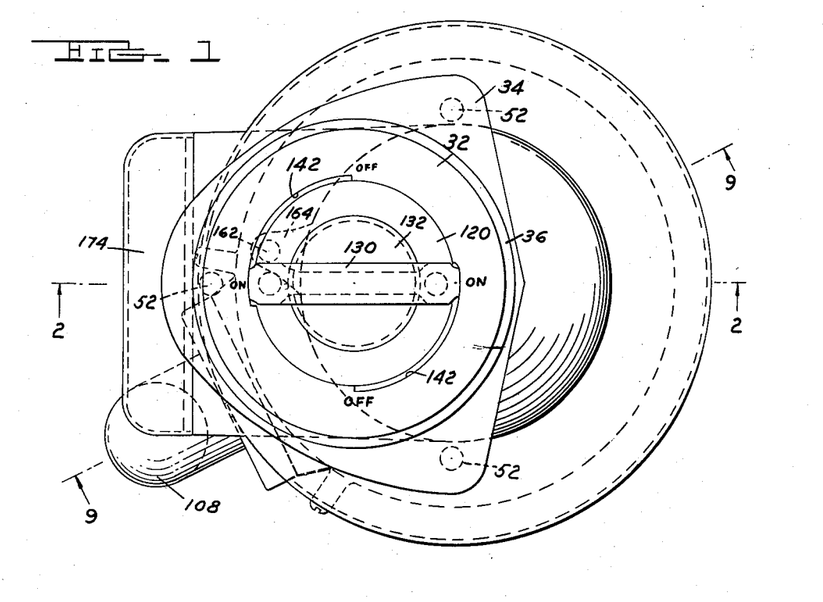
Figure 1, a plan view of the assembled device.
Figure 1B:
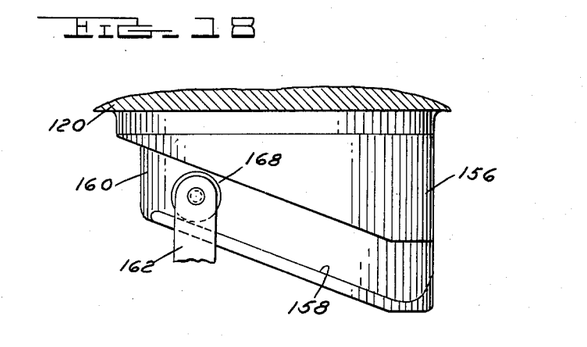

In order to stop the motion of the rotor it is necessary to turn the ring 120 back to its position shown in Figures 1 and 2. This can be done by re-applying the handle 130 if it has been removed and rotating the combination stopper in a counter-clockwise direction.

Figure 5:
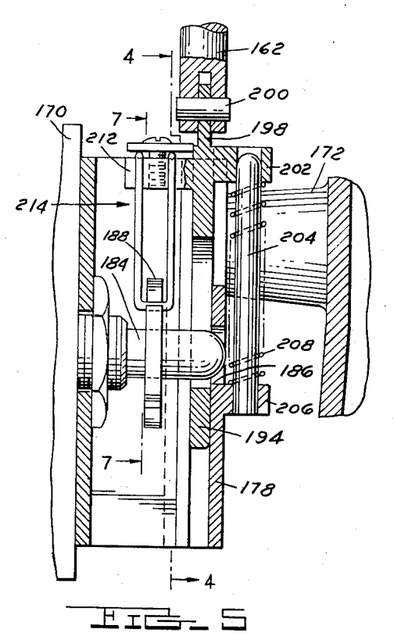
Figure 5, an elevation of the details of the switch mechanism.
Figure 6:
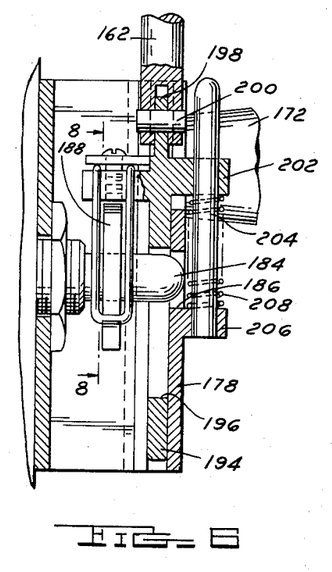
Figure 6, a view of the switch mechanism in the actuated position.

This permits the switch pin 162 to return to its up position as shown in Figure 5. The upward motion of the pin 162 permits the vertical plate 194 to move upwardly, carrying the U-shaped actuator 214 upwardly and shifting the ratchet wheel 188 in a clockwise direction in Figure 8.

The switch is then turned off, and the next time it turns on by downward movement of member 214 it is in a different position and will rotate the rotor unit 86 in a different direction since the motor of the unit is a reversible motor and the switch 170 is wired to the motor in such a way as to reverse the motor each time the shaft 184 is rotated 180 degrees.

It will thus be seen that while the motor is operating it is impossible to remove the primary stopper ring 120, and thus the opening into the shredding chamber is of such size that material may be fed into the chamber in small amounts but it would be impossible for a person to insert his hand into the chamber.

The device is also arranged that whenever both stoppers are applied and the motor is on it is impossible to close the sink drain, thus permitting water to flow into the unit.

Figure 22:
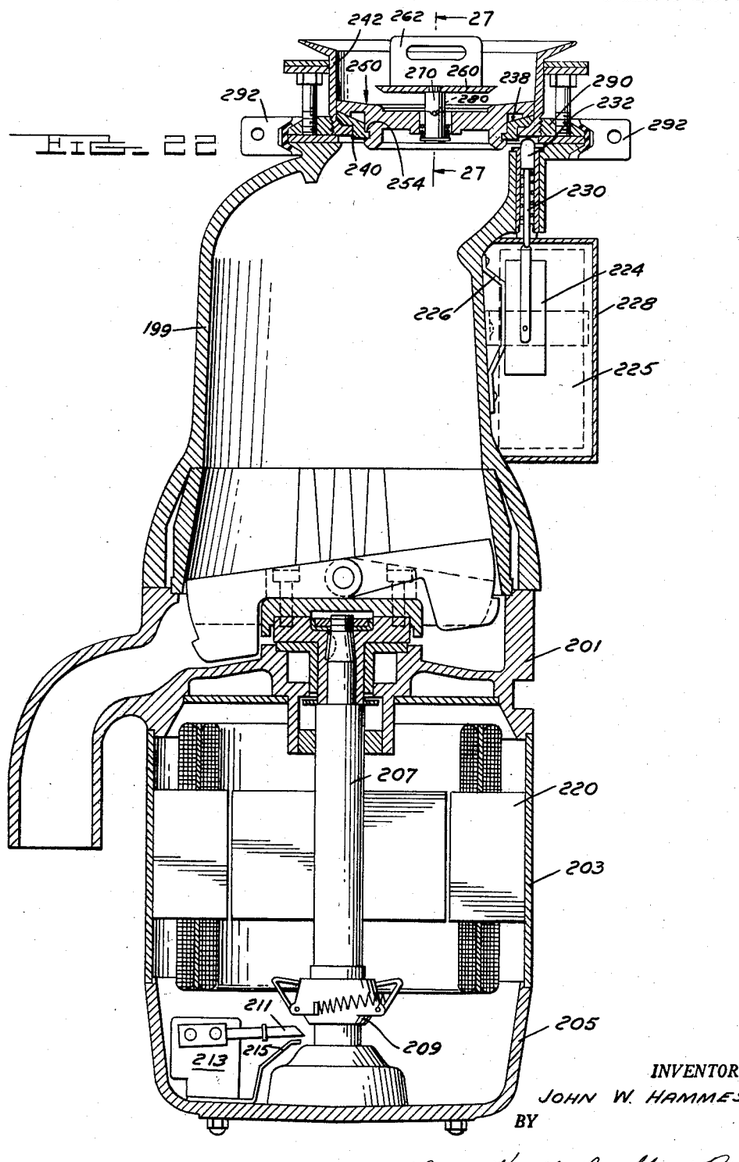
Figure 22, a vertical section of a modified form of the invention utilizing a modified type of feed stopper and a centrifugal reversing switch control.
Figure 23:
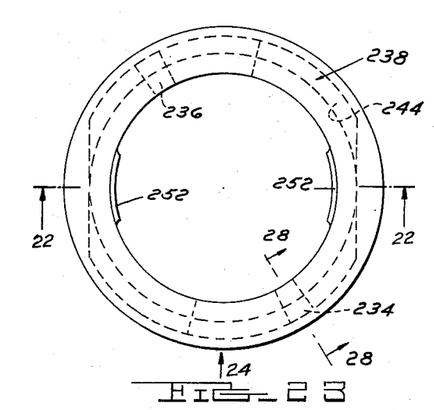
Figure 23, a plan view of the outer actuator ring shown in Figure 22, the view of Figure 22 being on line 22—22 of Figure 23.
Figure 29:
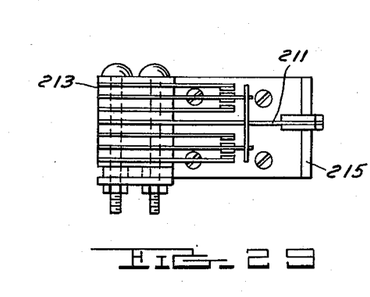
Figure 29, a plan view of the motor starting reversing switch shown in side elevation in Figure 22.

In Figure 22 a modified form of the disposal unit is shown having the same basic construction of a main receptacle 199, an intermediate housing 201, and a motor housing 203 with a lower endbell 205. At the bottom of the motor shaft 207 is a centrifugal unit 209 which actuates a switch arm 211 on a reversing switch 213 shown in Figures 22 and 29.

It will be seen that the reversing switch arm 211 rides on a supporting bracket 215 and has a neutral position as well as a double throw which permits it to move in one direction to actuate the reversing motor 220 in one direction; and when the switch is actuated in an opposite direction, the motor will reverse.

The centrifugal unit 209 rises with centrifugal action and increase of speed of motor shaft 207. As the motor shaft comes to rest after any particular operation, the unit 209 will ride down and contact the arm 211, shifting it in the direction of its residual motion into a contact position.

When the starter switch to be later described is actuated, the motor will start in the opposite direction from which it was moving previously. As it starts, the unit 209 will rise out of contact with the lever 211; and when the motor again stops, the lever 211 will move in the opposite direction from its previous position.

The actuating or energizing switch 224 for the entire circuit is mounted on the side of the housing 199 on a bracket 226 surrounded by a housing 228. This switch is actuated by a spring-pressed plunger 230 having a head portion 232 adapted to be contacted by downwardly projecting lugs 234 or 236 on an actuator ring 238 resting on a ledge 240 at the bottom of a sink collar 242. The sink collar is shaped similar to that shown in Figure 2 to have straight ledge portions which co-operate with a groove 244 to hold the ring against vertical displacement once it has been inserted and slightly turned.

Figure 24:
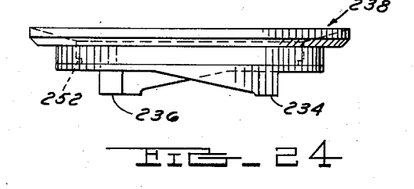
Figure 24, a side elevation of the actuator ring of Figure 23 taken at line 24—24 of Figure 23.
Figure 25:
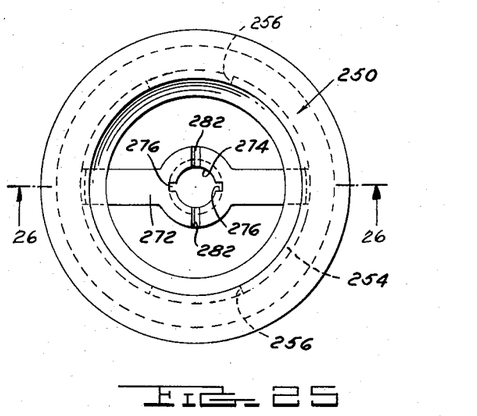
Figure 25, a plan view of the secondary ring shown in Figure 22.
Figure 26:
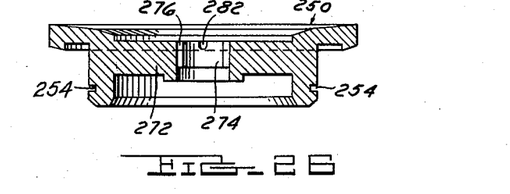
Figure 26, a sectional side view of the secondary ring on line 26—26 of Figure 25.
Figure 28:
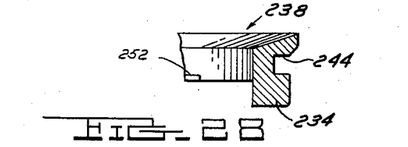
Figure 28, a sectional view of the stopper on line 28—28 of Figure 23.

The projections 234 and 236 (see Figures 24 and 28) move around when the ring 238 is turned to a position where they will press plunger 232 downwardly to close switch 224 and start the motor circuit operating. A capacitor unit 225 is also mounted adjacent switch 224 in the housing 228.

A similar motor circuit is shown in my co-pending application Serial No. 722,201, filed January 15, 1947, now Patent No. 2,667,308, issued January 25, 1954, with the exception that in the previous application a solenoid was used to actuate the reversing switch, whereas in the present case the centrifugal device 209 is used to actuate the reversing switch.

As shown in Figure 22, within the ring 238 a secondary ring 250 is located to serve as a supplemental closure for the opening in ring 238. Two diametrically opposed lugs 252 co-operate with a groove 254 in ring 250 to lock the rings together, there being openings 256 in the lower edge of member 250 to permit the telescoping of the two rings.

Figure 27:
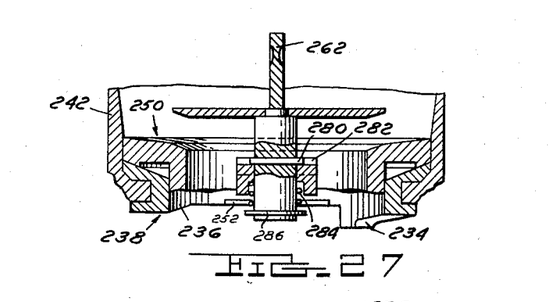
Figure 27, a sectional view of the modified stopper arrangement in assembly on line 27—27 of Figure 22.

As shown in Figures 22 and 27, a closure disk 260 has a vertically extending handle portion 262 and a downwardly extending stud 270. The stud extends through a spider connector 272 in ring 250. A hole 274 is provided in this spider centrally of the ring having side slots 276.

A pin 280 extends through the stud 270 and projects outwardly on each end so that it will slip down through the slots 276 when aligned therewith and be supported in grooves 282 when positioned to register therewith. A spring 284 bearing on a retaining ring 286 urges the closure member toward a downward position. Suitable stops are provided between the units so that turning of the handle portion 262 will turn ring 238 to cause actuation of the switch plunger 232, thus energizing the motor circuit. This turning action is preferably only possible when the member 260 is in an up position to allow flow through the unit as it operates. Pin 280 will not transmit motion to ring 250 in the down position since it lies in the enlarged bore below the slots 276.

The unit shown in Figure 22 is supported on the sink collar 242 by a threaded ring 290, which is clamped to the top of housing 200 by clamping ring 292 to hold the housing in sealing relation with the ring 290 and the collar 242.

It will be seen that in the operation of this modified unit the control is from the sink closure member, and each time that the plunger 230 is actuated to close switch 224 the unit will operate in a different direction because of the action of the reversing switch 214 in conjunction with the centrifugal unit 210.

I claim:

1. A combination stopper and switch actuator for an electrically operated under-sink type of waste disposal unit associated with a sink drain opening which comprises a primary apertured stopper element axially insertable into the drain opening and rotatable to a switch actuating position, a secondary stopper element engageable axially with said primary element to close the drain, and means to shift said elements axially upon mutual rotation toward the switch actuating position to open the drain.

2. A combination stopper unit as defined in claim 1 in which the secondary stopper member is removable at will to clear the apertures in the primary stopper for continuous feed of the disposal unit.

3. In combination for use with an electrically operated under-sink type of waste disposal unit associated with a sink-drain opening, a shredding chamber comprising a housing having an entrance passage axially offset from said chamber and positioned below the sink-drain opening, and a combination stopper and switch actuator to permit batch feed and continuous feed to said chamber comprising a primary apertured stopper element axially insertable into the drain opening and rotatable to an axially locked switch actuating position, a secondary stopper element axially engageable with said first element to block said sink drain opening, means to shift said elements axially upon mutual rotation toward the switch actuating position to open the apertures in the primary stopper, and means to engage said stopper elements for mutual removal and disengageable for removal of the secondary element for continuous feed of waste material during the operation of the device.

4. A waste disposal apparatus comprising a drain collar adapted to be supported on a vertical axis in a sink-drain opening, a housing having a shredding chamber positioned below said collar and supported on said collar, a shredding rotor in said shredding chamber, electrical power means to actuate said rotor, switch means to control said power means, a stopper ring in said collar rotatably supported thereby, means depending from said ring into the top portion of said shredding housing, switch actuating means operably associating said switch with said depending means, and a control member for said stopper ring comprising means vertically movable into the opening of said ring to close the same, and inter-engaging means on said ring and said control member whereby rotation of said control member will cause rotation of said ring and actuation of said switch.

5. In a waste disposal apparatus of the type to be supported in a drain opening of a sink, a supporting collar, a shredding housing to be charged with waste material supported on said housing, a rotatable ring in said collar having a sealing engagement with the walls of said collar, power means in said device to be actuated by an electric motor, switch means controlling said motor, means on said switch and means on said ring operable to actuate said switch in response to rotating movement of said ring, and means axially movable relative to said ring having a portion to interengage with said ring for mutual rotation therewith and a portion to close the opening in said ring when said parts are moved together axially.

6. A waste disposal apparatus of the type having an electric motor-driven impeller in a shredding housing, a switch to control said motor, and in which the housing is supported in the opening of a drain receptacle which is connected by a supporting collar to support the housing of the unit, a switch actuating member positioned in said housing adjacent said collar, an open center sealing ring having a rotatable sealing engagement with the inside of said collar and removably supported in said collar, means on said ring movable with the ring to shift said switch actuator in response to movement of said ring, and a control means for said ring comprising a closing plate axially shiftable relative to said ring to inter-fit the opening in said ring and close the same, and means inter-engaging said control means and said ring to cause simultaneous rotation or axial movement of said ring with said control means.

7. In a waste disposal unit of the type to be supported in a sink and having a motor-driven impeller at the bottom of a waste chamber, and a switch to actuate a motor driving said impeller, a combination drain closure and switch actuator combination comprising a supporting collar for positionment in a sink drain, a closure ring removably and rotatably associated with the inside of said collar having sealing engagement with said collar at the outer edge, means on said ring to actuate said switch in response to rotation of said ring, and control means for said ring comprising a member inter-engaging with said ring for axial movement relative thereto and rotatable movement therewith comprising a stopper member to close the opening in said ring in one position of said members, and means on said collar and means on said control means mutually operable to shift said control means axially away from said ring when said parts are rotated to a switch actuating position.

8. For use with a waste disposal unit, a switch actuator and sink drain stopper comprising a supporting collar in said sink drain, a ring rotatably associated with said collar having sealing engagement therewith, a switch actuating mechanism, means associating said mechanism with said ring whereby in one position said switch will be in an "on" position and in another position of said ring said switch will be in "off" position, and control and stopper means for said ring rotatably associated with said collar and axially shiftable relative to said ring comprising a stopper plate to seal the opening in said ring and means inter-engaging said control means and said ring and said collar whereby simultaneous rotation of said control means and said ring to a switch actuating position will cause axial shifting of said control means away from said ring to move the stopper means from its closed position.

9. A combination stopper and switch actuator for an electrically operated under-sink type of waste disposal unit associated with a sink-drain opening which comprises a primary apertured stopper element axially insertable into the drain opening and rotatable from an insertion position to a switch actuating position, and a secondary stopper element axially movable to interlock radially with said primary element to serve as an actuator for said primary stopper, said elements being movable axially to a relative open or closed position at the insertion position and being adapted to interlock radially in an open position at the switch actuating position to permit water flow at all times during operation of the unit.

10. A combination starter and switch actuator for an electrically operated undersink type of waste disposal unit associated with a sink drain opening which comprises a primary apertured stopper element axially insertable into the drain opening and rotatable from an insertion position to a switch actuating position, a secondary stopper element axially engageable with said primary element, means on said secondary stopper element axially shiftable to an open and a closed position selectively, means to turn said elements simultaneously, an electric motor, a switch for actuating said motor, and means operably associating said stopper elements and said switch whereby said switch is actuated by rotation of said stopper elements.

11. A waste disposal apparatus comprising a drain collar adapted to be supported on a vertical axis in a sink-drain opening, a housing having a shredding chamber positioned below said collar and supported on said collar, a shredding rotor in said shredding chamber, electrical power means to actuate said rotor, switch means to control said power means, a stopper ring in said collar rotatably supported thereby, means depending from said ring into the top portion of said shredding housing, switch actuating means operably associating said switch means with said depending means, and a control member for said stopper ring connected with said ring for movement toward and away from said ring and including a part movable into and out of said opening by such motion to close and open said opening respectively whereby rotation of said control means will cause rotation of said ring and actuation of said switch.

12. Waste disposal apparatus comprising a stationary drain collar adapted to be supported on a vertical axis in a sink drain opening, a housing having a shredding chamber positioned below said collar and supported on said collar, a shredding rotor in said shreding chamber, electrical power means to actuate said rotor, switch means to control said power means, a stopper ring insertable in said collar and rotatable from an insertion position to a switch actuating position, means including a cam member on said ring for actuating said switch means when the ring is rotated to its switch actuating position in said collar, control means for said ring including a handle member and a stopper, means connecting said control means to said ring whereby rotation of said handle causes rotation of said ring, said connecting means permitting movement of said stopper toward and away from said ring to selectively close or open the opening in said ring, and a projecting member connected to said stopper and engageable with an abutment on said collar for preventing movement of said stopper to close the opening in said ring when said ring is in its switch actuating position in said collar.

13. In combination for use with an electrically operated under-sink type of waste disposal unit associated with a sink-drain opening, a shredding chamber housing and an entrance housing connected by a joining passage, a switch mechanism positioned on the shredding housing below the entrance housing, a combination stopper unit and switch actuator selectively operable to close the sink drain in one position and to open the drain and actuate the switch in another, and means operably associating said stopper and said switch, said switch being actuated by a rotatable shaft shiftable to four positions, two positions 180° opposed being "off" positions, and two positions 180° opposed being "on" positions, but arranged to energize the device in opposite directions.

14. In combination for use with an electrically operated under-sink type of waste disposal unit associated with a sink-drain opening, a shredding chamber comprising a housing having an entrance passage positioned below the sink drain opening, and a combination stopper and switch actuator means selectively removable to allow batch feed in large quantities and continuous feed during machine operation only in smaller quantities to said chamber, said means comprising a switch actuator ring operatively associated with the entrance passage and movable to a locked-in position when in switch actuating position, and a stopper element engageable with said ring to serve as an actuator therefor and as a stopper for the opening in said ring, said stopper element being operatively associated with said entrance passage and said ring wherein said stopper is blocked from engagement with the opening in said ring in the switch actuating position, said stopper element being disengageable from said ring in the switch actuating position to permit the passage of waste to the shredding chamber.

15. In a waste disposal apparatus, for suspension below a sink, of the type having a drain collar, shredding chamber, rotor and a motor for driving the rotor, a switch-actuating combination stopper unit comprising a plurality of elements to position in said drain collar as a stopper, said elements being movable axially relative to each other to a spaced position to permit flow therethrough while in said drain collar, means to interlock said elements radially to permit rotation of one by the other, and means associating one of said elements with said switch whereby rotation of said one of said elements by manual shifting of the other will actuate said switch while said elements are in a vertically spaced position.

16. In combination for use with an electrically operated under-sink type of waste disposal unit associated with a sink-drain opening and a sink-drain collar in said opening large enough for the insertion of a human hand, a shredding chamber comprising, a housing having an entrance passage positioned below the sink drain opening, a rotor in said housing, and a motor for driving the rotor, a switch for causing actuation of said motor, a means operatively connecting with said switch shiftable to actuate said switch, and a combination stopper and switch actuator means selectively removable to allow batch feed in large quantities and having an opening to permit continuous feed during machine operations only in smaller quantities to said chamber, said means comprising a switch actuator ring operatively associated with the entrance passage and movable to a position to contact and actuate said switch actuating means, the opening of said ring being dimensioned to prevent insertion of the human hand, and a stopper element engageable with said ring to serve as a stopper for the opening in said ring, said stopper element being completely disengageable from said ring in the switch actuating position without stopping said motor to permit the passage of waste in smaller quantities to the shredding chamber.

17. In combination for use with an electrically operated, under-sink type of waste disposal unit associated with a sink drain opening and a sink-drain collar in said opening large enough for the insertion of the human hand, a shredding chamber comprising, a housing having an entrance passage positioned below the sink drain opening, a rotor in said housing and a motor for driving the rotor, a switch for causing actuation of said motor, a means operatively connecting with said switch shiftable to actuate said switch, a stopper ring positionable in said sink drain opening, means on said ring engageable with said first means to actuate said switch upon rotation of said ring to a switch actuating position, said ring having a drain opening substantially smaller than the sink drain opening, a secondary stopper element engageable with and shiftable axially on said ring to close or open said opening in said ring, and means associating said ring and said stopper element wherein said ring can rotate to switch actuating position only when said stopper element is shifted to open said ring.

References Cited in the file of this patent

UNITED STATES PATENTS

| | | | |
|---|---|---|---|
| 1,807,574 | Johnston | May 26, | 1931 |
| 1,965,033 | Dillon | July 3, | 1934 |
| 2,156,075 | Alexay | Apr. 25, | 1939 |
| 2,196,319 | McLaughlin | Apr. 9, | 1940 |
| 2,225,171 | Hammes | Dec. 17, | 1940 |
| 2,232,545 | Lum | Feb. 18, | 1941 |
| 2,244,402 | Powers | June 3, | 1941 |
| 2,428,420 | Green | Oct. 7, | 1947 |
| 2,484,459 | Osborn | Oct. 11, | 1949 |
| 2,544,745 | Ashbaugh et al. | Mar. 13, | 1951 |
| 2,657,397 | Drew | Nov. 3, | 1953 |
| 2,669,395 | Swisher | Feb. 16, | 1954 |
| 2,678,775 | Simmons | May 18, | 1954 |